US006542607B1

(12) United States Patent
Euchner et al.

(10) Patent No.: US 6,542,607 B1
(45) Date of Patent: Apr. 1, 2003

(54) DEVICE AND METHOD FOR THE CRYPTOGRAPHIC PROCESSING OF A DIGITAL DATA STREAM PRESENTING ANY NUMBER OF DATA

(75) Inventors: Martin Euchner, München (DE); Wolfgang Klasen, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/242,796

(22) PCT Filed: Jul. 2, 1997

(86) PCT No.: PCT/DE97/01397
§ 371 (c)(1),
(2), (4) Date: Feb. 23, 1999

(87) PCT Pub. No.: WO98/10559
PCT Pub. Date: Mar. 12, 1998

(30) Foreign Application Priority Data

Sep. 3, 1996 (DE) .......................................... 196 35 757

(51) Int. Cl.$^7$ .............................. H04L 9/06; H04K 1/02
(52) U.S. Cl. ............................. 380/37; 380/29; 380/42
(58) Field of Search ............................. 380/28, 29, 42, 380/262, 37; 713/160, 161

(56) References Cited

U.S. PATENT DOCUMENTS 5,517,614 A * 5/1996 Tajima et al. ................ 395/180
5,727,062 A * 3/1998 Ritter ........................... 380/37

OTHER PUBLICATIONS

Kohl, J T, "The use of Encryption in Kerberos for Network Authentication", Advances in Cryptology, Proceedings, Santa Barbara, CA, Aug. 20–24, 1989, XP 000135668, pp. 35–43.

Biham, E, "Cryptanalysis of Multiple Modes of Operation", 4$^{th}$ International Conference on the Theory and Applications of Cryptology, Proceedings, Advances in Cryptology, XP 00527601, pp. 278–292.

Ehrsam, W F et al, "Fractional Block–Size Cipher", IBM Technical Disclosure Bulletin, Jul. 1979, vol. 22, No. 2, Jun. 1979, XP 002051943, pp. 640–642.

Jansen, C J A, Investigations on Non–Linear Streamcipher Systems: Construction and Evaluation Method, PhD. Thesis, (1989), pp. 22–28.

Matyas, S M et al, Message Authentication with Manipulation Detection Codes; Proceedings IEEE (1983) Symposium on Security and Privacy, pp. 66–365.

Kohl, J T, The Use of Encryption in Kerberos for Network Authentication, Advances in Cryptology, CRYPTO 1989, LNCS, vol. 435, Springer Verlag, 1990, pp. 36–39.

Schneider, B, "Angewandte Kryptographie", Addison–Wesley Publishing Company, Bonn, ISBN 3–89319–854–7, (1996), pp. 227–246.

* cited by examiner

Primary Examiner—Justin T. Darrow
(74) Attorney, Agent, or Firm—Staas & Halsey LLP

(57) ABSTRACT

A digital data stream comprises an arbitrary number of data block ($P_n$). For a data block, a first processing element (B1n) is provided that contains at least one first logic unit (VK1), an encryption unit ($E_k$), and a second logic unit (VK2). With the first logic unit (VK1), the respective data packet ($P_n$), at least one preceding data packet ($P_{n-1}$), and a preceding intermediate quantity ($I_{n-1}$) are combined and are encrypted in the encryption unit ($E_k$) to form the intermediate quantity ($I_n$).

The intermediate quantity ($I_n$) is combined with a preceding cryptographically processed data block ($C_{n-l}$) to form the cryptographically processed data block ($C_n$).

26 Claims, 3 Drawing Sheets

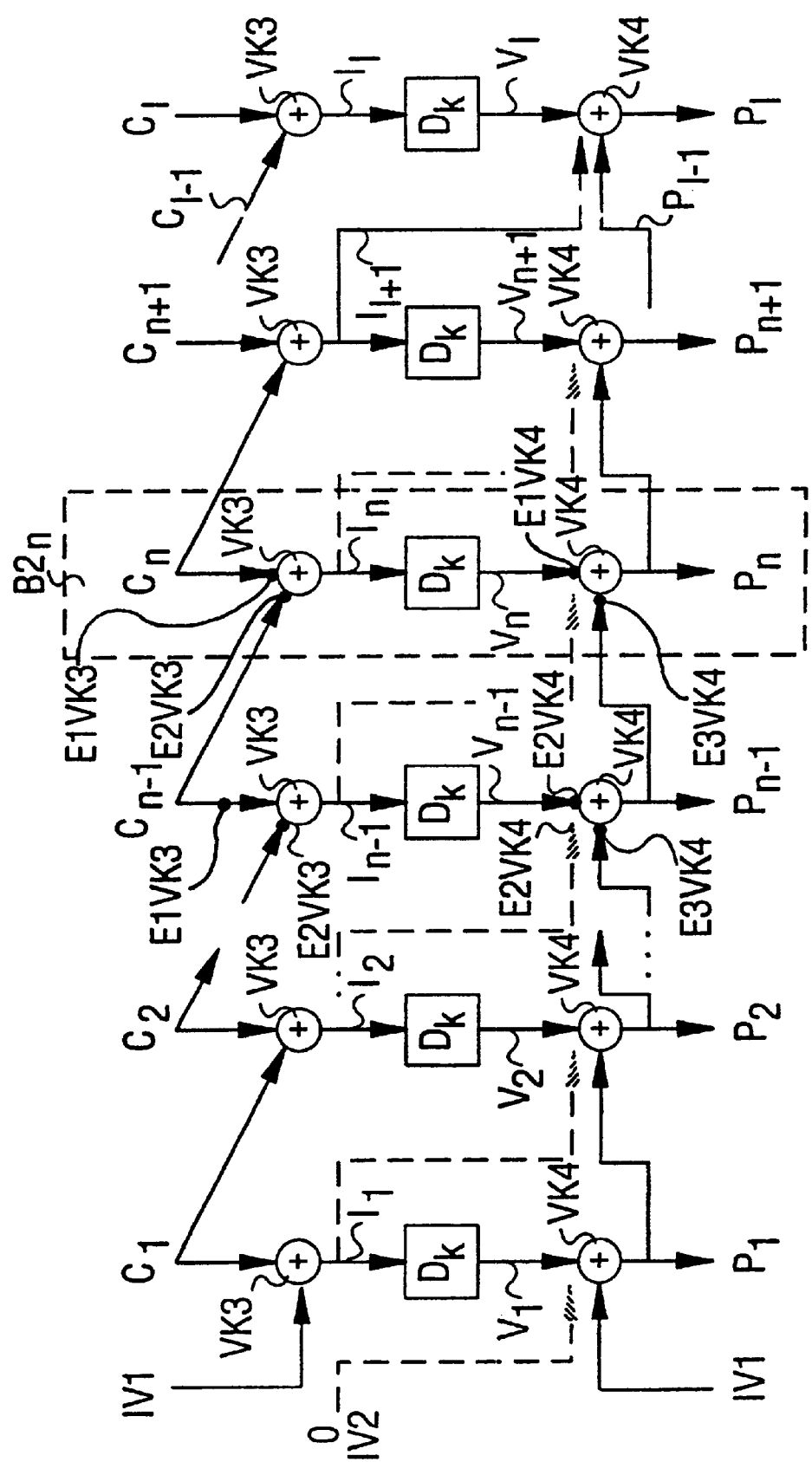

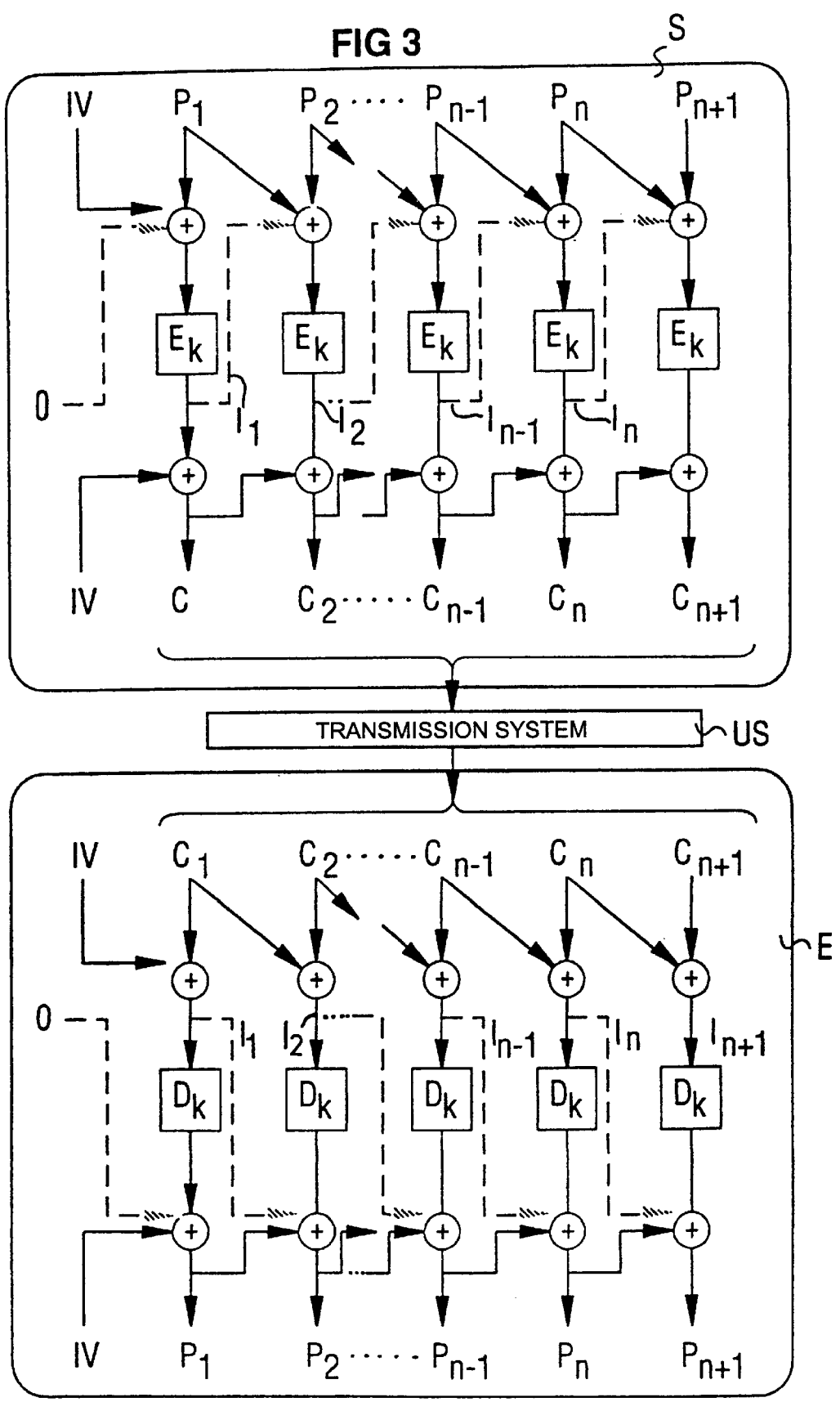

DEVICE AND METHOD FOR THE CRYPTOGRAPHIC PROCESSING OF A DIGITAL DATA STREAM PRESENTING ANY NUMBER OF DATA

In the transmission of confidential data, it is often required both that on the one hand the data are confidential and on the other hand that it is also ensured that the received data have been transmitted unchanged and thus also without error. These two characteristics are described by the two security services of confidentiality and integrity.

It was previously standard to realize the security services confidentiality and "explicit integrity" in a manner chronologically and logically separate from one another and in two independent operating steps.

Standardly, there took place a determination of what is known as a message authentication code (MAC) as a proof of integrity. For the formation of an MAC, arbitrary hash methods or also methods according to the ISO-9797 standard can for example be used. Subsequently, it has previously been standard to encrypt the message. For the encryption, what are known as block encryption methods have been used in the transmission of data blocks. For the flow-oriented encryption, it is thereby known to use what is called a chaining mode in the context of the block encryption, for example what is known as cipher block chaining mode (CBC Mode).

The separate realization of the two security services confidentiality and integrity in two separate operating steps is very expensive, which is a significant disadvantage particularly in transmissions of data with a very high required data rate.

With the use of the method described in the ISO-9797 standard, it is also for example required to use and to manage two different symmetrical key pairs. This leads to a considerable additional required computing expense in the key management of the cryptographic keys.

In order to ensure the security service confidentiality as well as the security service integrity together in one operating step, a block-oriented encryption mode for the transmission of data blocks would be required, having the characteristic of effecting a strong error propagation of the encrypted data stream at the receiver in case of accidental or malicious disturbances of the encrypted data stream during transmission between a sender and a receiver.

The known chaining modes often have a weak error propagation due to what is known as self-synchronization, e.g. the CBC mode. The known chaining modes with strong error propagation also contain cryptographic weaknesses, as a result of which they are unsuitable for the common ensuring of integrity and confidentiality implicit in an encryption method, i.e., in a method step.

An overview of various chaining modes may be found in C. J. A. Jansen, Investigations on non-linear Streamcipher Systems: Construction and Evaluation Methods, PhD. Thesis, Philips USFA BV., pages 22–28, 1989; or in B. Schneider, Angewandte Kryptographie, Addison-Wesley Publishing Company, Bonn, ISBN 3-89319-854-7, $1^{st}$ ed., pages 227–246, 1996.

What is known as a CBC message authentication code (MAC) contains only a limited and fixed number of information bits. The security of an identity check value (integrity check value, ICV) used is given thereby. The security of the CBC-MAC is thus not scalable.

In addition, from Kohl, The use of Encryption in Kerberos for Network Authentication, Advances in Cryptology, CRYPTO'89, LNCS, Vol. 435, pages 36–39, Springer Verlag, 1990, a chaining mode is known with strong error propagation, called plaintext cipher block chaining mode (PCBC mode). The Kohl reference further specifies that with the use of the PCBC method a modification of the sequence of the transmitted encrypted data blocks cannot be recognized. For this reason, the PCBC method and also the CBC mode cannot be used with what is called a constant integrity check value (CICV) for securing the confidentiality and the implicit integrity of a transmitted data stream.

From S. M. Matyas et al, Message Authentication with Manipulation Detection Codes; Proceedings IEEE 1983 Symposium on Security and Privacy, Oakland, Calif., pages 66–365, 1993, the principle of what is called "implicit" integrity and the general principle of a chaining mode are known.

SUMMARY OF THE INVENTION

The invention is thus based on the problem of indicating an arrangement and a method for the cryptographic processing of a digital data stream, with which arrangement or, respectively, method both the security service of confidentiality and also the security service of integrity is possible with a reduced requirement of computing capacity.

In the arrangement, of the present invention, a first processing element is provided for at least one part of the data blocks to be transmitted of the data stream, which element contains at least one first logic unit, an encryption unit, and a second logic unit. The first logic unit is supplied with the data of the respective data block via a first input, with the data of a preceding data block via the second input, and with a preceding intermediate quantity via a third input. In the logic unit, these quantities are combined to form a combination quantity. The combination quantity is supplied to the logic unit, in which a block encryption method is applied to the combination quantity. The result of the block encryption is an intermediate quantity which is supplied to the second logic unit. In addition, the second logic unit is supplied with a previously cryptographically processed data block. By combination of the intermediate quantity with the preceding cryptographically processed data block, the cryptographically processed data block is determined for the respective data block. The totality of the cryptographically processed data blocks yields the digital data stream to be transmitted.

In the arrangement of a further embodiment of the present invention, for at least one part of cryptographically processed data blocks a second processing element is provided that comprises at least a third logic unit, a decryption unit, and a fourth logic unit. The received cryptographically processed data block is supplied to the third logic unit via a first input, and at least one preceding cryptographically processed data block is supplied to the third logic unit via a second input. The data blocks are combined with one another in the third logic unit. The result of the combination in the third logic unit is the intermediate quantity. The intermediate quantity is deciphered with the decryption unit, and a combination quantity is determined. The fourth logic unit is supplied with the combination quantity via a first input, with at least one preceding intermediate quantity via a second input, and with at least one preceding data block via a third input, and in the fourth logic unit is combined to form the data block.

In the arrangement of a further embodiment of the present invention a transmission unit and a receive unit are provided. In addition, a transmission system is provided between the transmission unit and the receive unit for the transmission of the cryptographically processed data stream.

Among other things, the arrangements have the advantage that for the first time an encryption and an integrity securing are possible in one processing step, the encryption. An additional, explicit integrity securing is no longer required in this arrangement. This leads to a considerable processing speed, which can at a maximum be doubled, in the cryptographic processing of a data stream.

In addition, the arrangements have the advantage that a chaining mode is realized that is significantly superior to the known chaining modes, because on the one hand it comprises a strong error propagation, and on the other hand the attacks that could not be recognized with the PCBC mode can also be recognized.

The securing of the implicit integrity by means of the use of a constant integrity check value (CICV) and the encryption of the data with a strongly error-propagating chaining mode enables an advantageous scaling of the security by means of the use of arbitrarily long ICVs.

In the method according to the present invention, an intermediate quantity is determined from a data block, by encrypting the data block with a block encryption method, taking into account at least one preceding data block and at least one preceding intermediate quantity. In addition, a cryptographically processed data block is determined from the intermediate quantity by means of combination with at least one preceding cryptographically processed data block.

The method according to another embodiment of the present invention essentially comprises the inverse steps to the method described above. An intermediate quantity is thereby determined from the cryptographically processed data block by means of combination with a previous cryptographically processed data block, and a combination quantity is determined from the intermediate quantity using a block encryption method, by decryption of the intermediate quantity. The combination quantity is combined with at least one preceding intermediate quantity and with at least one preceding data block, whereby a data block is determined.

In the method according to a further embodiment of the present invention, the method steps above described are combined with one another in such a way that the cryptographically processed data are first formed in a transmission unit, are transmitted by the transmission unit to a receive unit, and the cryptographically processed data are then in turn processed according to the method with the inverted steps.

In order to increase the cryptographic security both of the arrangement and also of the methods, it is advantageous to take into account a first predeterminable value in the logic units, or, respectively, in the combination of the first data block or, respectively, cryptographically processed first data block.

The security of the chaining mode can advantageously be increased in relation to other known chaining modes in that a second initialization value is used in the first processing stage as an additional secret parameter.

Both the arrangements and also the methods can advantageously be used both for encryption alone, for integrity securing alone, and also for common encryption and integrity securing.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

FIG. 2 shows a drawing of an arrangement according to patent claim 2;

FIG. 3 shows a drawing of the arrangement according to patent claim 3.

DESCRIPTION OF THE PREFERRED EMBODIMENTS

Figure 1:
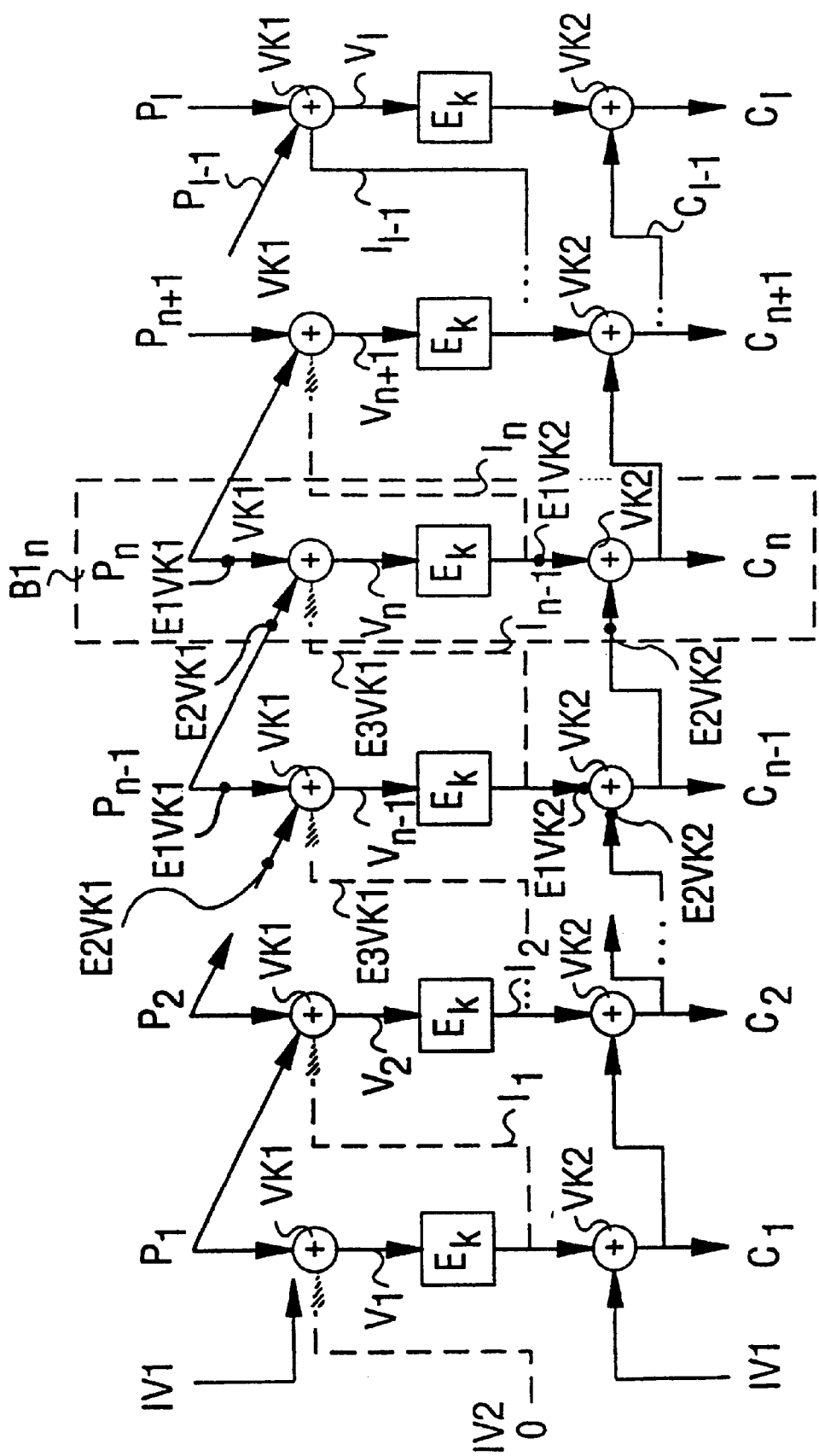
FIG. 1 shows a drawing of the arrangement according to patent claim 1.

FIG. 1 shows an arrangement for the cryptographic processing of a digital data stream. The digital data stream comprises an arbitrary number of data blocks $P_n$. The data blocks $P_n$ respectively comprise an arbitrary number of bits. An index n designates each data block of the digital data stream unambiguously and is a natural number between 1 and l, whereby l designates a number of data blocks $P_n$.

A first processing element B1n, whose design is explained in more detail below, is respectively provided for at least one part of the data blocks $P_n$.

A first logic unit VK1, an encryption unit $E_k$, and a second logic unit VK2 are respectively provided in the first processing element B1n.

The first logic unit VK1 comprises three inputs. The data block $P_n$ is supplied to the first logic unit VK1 via a first input E1VK1 of the first encryption unit. At least one preceding data block $P_{n-1}$ is supplied to the first logic unit VK1 at a second input E2VK1 of the first logic unit VK1.

At least one preceding intermediate quantity $I_{n-1}$ is supplied to the first logic unit VK1 via a third input E3VK1 of the first logic unit VK1.

Even if in FIG. 1 the directly preceding data packet $P_{n-1}$ or, respectively, the directly preceding intermediate quantity $I_{n-1}$ is supplied to the first logic unit VK1 respectively only via the second input E2VK1 or, respectively, the third input E3VK1, it is however provided in alternative constructions of the arrangement to supply the first logic unit VK1 with further past data packets $P_{n-2}, \ldots P1$, as well as with further past intermediate quantities $I_{n-2}, \ldots I_1$.

The specification of a taking into account only of the directly preceding data block $P_{n-1}$, or, respectively, of the preceding intermediate quantity $I_{n-1}$, serves only for the clearer representation of the inventive arrangements.

The first logic unit VK1 is coupled with an encryption unit $E_k$. In the encryption unit $E_k$, a combination quantity $V_n$, determined by combination of the quantities supplied to the first logic unit VK1, is encrypted. The encryption takes place using an arbitrary block encryption method, as it is known, for example according to the DES method or also according to the IDEA method. Additional block encryption methods can unproblematically be used without limitation within the scope of these arrangements and within the scope of the methods.

The letter k designates the secret cryptographic key used respectively for the encryption and for the decryption specified below.

As a result, the encryption unit $E_k$ supplies a quantity $I_n$, that corresponds to the encrypted combination quantity $V_n$. The intermediate quantity $I_n$ is supplied on the one hand to a second logic unit VK2, described below, as well as to the first logic unit VK1 of the following first processing element B1n+1.

The intermediate quantity $I_n$ is supplied to the second logic unit VK2 via a first input E1VK2 of the second logic unit VK2.

In addition, the second logic unit VK2 comprises a second input E2VK2, via which at least one preceding cryptographically processed data block $C_{n-1}$, $C_{n-2}$, ... $C_1$ is supplied to the second logic unit VK2.

In the logic unit VK2, the at least one preceding cryptographically processed data block $C_{n-1}$ and the intermediate quantity $I_n$ are combined with one another, and the result of the combination forms the cryptographically processed data block $C_n$.

In a development of the arrangement, the first logic unit VK1 and/or the second logic unit VK2 can be constructed in such a way that the combination of the supplied data takes place respectively by means of a bit-by-bit EXCLUSIVE-OR combination.

In addition, in a development it is provided to provide a first processing element B11 with a different structure for the processing of the first data block $P_1$. However, the first processing element B11 in turn contains the first logic unit VK1, the encryption unit $E_k$, and the second logic unit VK2.

The first data block $P_1$ is supplied to the first logic unit VK1 via a first input E1VK1 of the first logic unit VK1. In addition, however, in the construction a freely predeterminable, advantageously secret first value IV1 is supplied to the first logic unit VK1.

In a development, it is provided to supply a freely predeterminable second value to the first logic unit VK1 via a third input E3VK1.

In a development, this first processing element B11 for the processing of the first data packet $P_1$ is further distinguished from the above-described design of the first processing element B1n in that the second logic unit VK2 is not supplied with at least one preceding cryptographically processed data block $C_{n-1}$, but rather, via the second input E2VK2, the first value IV1 is supplied to the second logic unit VK2.

The method for processing the digital data stream and for determining the cryptographically processed data blocks $C_n$ essentially corresponds to the structure of the above-described arrangement.

This means that at least one part of the data blocks $P_n$ is encrypted with a block encryption method to form the intermediate quantity $I_n$. In the encryption, at least one preceding data block $P_{n-1}$, as well as at least one preceding intermediate quantity $I_{n-1}$, are taken into account.

The intermediate quantity $I_n$ is combined with a preceding cryptographically processed data block $C_{n-1}$, whereby a cryptographically processed data block $C_n$ is formed.

In a development of the method, it is provided to combine the data block $P_n$, the preceding data block $P_{n-1}$, and the preceding intermediate quantity $I_{n-1}$, to form a combination quantity $V_n$, to which the block encryption method is applied.

In addition, in a development of the method it is provided to construct at least one of the two above-described combinations as an EXCLUSIVE-OR combination.

In a development, it is likewise provided to combine the first data block $P_1$ with the first value IV1, and, in a further construction, with the second value IV2. It is also provided to combine the formed first intermediate quantity $I_1$ only with the first value IV1 to form the first cryptographically processed data block $C_1$.

FIG. 2 shows an arrangement with which the method inverse to the above-described method may essentially be carried out.

Cryptographically processed data blocks $C_n$ are supplied to the arrangement. For at least a part of the cryptographically processed data blocks $C_n$, a second processing unit B2n is respectively provided, which contains at least a third logic unit VK3, a decryption unit $D_k$, and a fourth logic unit VK4.

The third logic unit VK3 comprises a first input E1VK3, via which at least one preceding cryptographically processed data block $C_{n-1}$ is supplied to the third logic unit VK3.

In addition, a second input E2VK3 of the third logic unit VK3 is provided, via which at least one preceding cryptographically processed data block $C_{n-1}$ is supplied to the third logic unit VK3. In the third logic unit VK3, the cryptographically processed data block $C_n$ and the at least one preceding cryptographically processed data block $C_{n-1}$ are combined to form the first intermediate quantity $I_n$.

The intermediate quantity $I_n$ is supplied to the decryption unit $D_k$, for example via a coupling of the third logic unit VK3 with the decryption unit $D_k$.

The decryption unit $D_k$ is constructed in such a way that a decryption of the intermediate quantity $I_n$ takes place with a cryptographic method using the cryptographic key k.

The result of the decryption is the combination quantity $V_n$. The combination quantity $V_n$ is supplied to the fourth logic unit VK4 via a first input E1VK4 of the fourth logic unit VK4.

In addition, a second input E2VK4 of the fourth logic unit is provided, via which at least one preceding intermediate quantity $I_{n-1}$, $I_{n-2}$, ... $I_2$, $I_1$ is supplied to the fourth logic unit VK4.

In addition, a third input E3VK4 of the fourth logic unit VK4 is provided, via which at least one preceding data block $P_{n-1}$, ... $P_2$, $P_1$ is supplied to the fourth logic unit VK4.

The above-described constructions of the above-described arrangement are also provided for this arrangement, for example the construction of the logic units VK3, VK4 as EXCLUSIVE-OR logic units. The supplying of the first value IV1 via the second input E2VK3 of the third logic unit VK3 for the processing of the first cryptographically processed data block $C_1$ is also provided in a development. This likewise holds for the supplying of the first value IV1 via the second input E2VK4 of the fourth logic unit VK4 into the fourth logic unit VK4, as well as for the supplying of the second value IV2 via the third input E3VK4 of the fourth logic unit VK4.

Corresponding to this arrangement, the method is essentially constructed in like manner. The cryptographically processed data block $C_n$ is combined with at least one preceding cryptographically processed data block $C_{n-1}$ to form the intermediate quantity $I_n$. The intermediate quantity $I_n$ is decrypted in the decryption unit $D_k$, and forms the combination quantity $V_n$. The combination quantity $V_n$ is combined with at least one preceding intermediate value $I_{n-1}$, ... $I_2$, $I_1$, as well as with at least one preceding data block $P_{n-1}$, ... $P_2$, $P_1$. The result of the combination is.then the data block $P_n$, again in plaintext.

The two above-described arrangements are used in common in a further arrangement, whereby the above-described arrangement for the formation of the cryptographically processed data blocks $C_n$ is provided in a transmission unit S and the arrangement for the formation of the data blocks in plaintext $P_n$ is provided in a receive unit E.

In addition, in this arrangement a transmission system US is provided with which the encrypted data stream formed from the cryptographically processed data blocks $C_n$ is transmitted from the transmission unit S to the receive unit E. An arbitrary transmission system US for the transmission of digital data, or for example also for the transmission of analog data, after conversion into analog data, in a transmission system US can be provided (see FIG. 3).

Corresponding to this arrangement shown in FIG. 3, a method is also constructed in which the above-described method steps of the method for the formation of the cryptographically processed data blocks $C_n$ are carried out without modification in relation to the above-presented method. The cryptographically processed data blocks $C_n$, and possible additional data that form the digital data stream, are transmitted to the receive unit E by the transmission unit S. The method for the formation of the data blocks $P_n$ in plaintext that was described above is, as described above, likewise carried out without modification on the received cryptographically processed data blocks C. in the receive unit E.

In this arrangement and in the method, all above-described developments are again provided without limitations.

In addition, in a development both of the arrangements and of the methods it is provided that the second value IV2 is assigned the value 0.

Both the arrangement and also the methods can advantageously be used either only for encryption, only for integrity securing of the data to be transmitted, or also for the ensuring of both security services, confidentiality and integrity.

If the arrangements and the methods are used for the encryption or, respectively, decryption of the digital data stream, for the encryption $E_k(P_1, P_2, \ldots P_1)$ there results the following algorithm using the cryptographic key k with the construction of a bit-by-bit EXCLUSIVE-OR combination:

$$I_n = E_k(P_n \oplus P_{n-1} \oplus I_{n-1})$$

$$C_n = I_n \oplus C_{n-1} \text{ for } n \geq 1.$$

For the decryption $D_k(C_1, C_2, \ldots C_1)$ the following method steps result:

$$I_n = C_n \oplus C_{n-1}$$

$$P_n = D_k(I_n) \oplus P_{n-1} \oplus I_{n-1} \text{ for } n \geq 1.$$

Both with the arrangements and also with the methods, it is achieved that this chaining mode comprises a strong error propagation, whereby it is possible to use only one constant integrity check value CICV for the securing of the integrity of a digital data stream.

The constant integrity check value CICV can for example be appended, in a data block, to the end of the digital data stream, and processed in a manner equivalent to the digital data stream. If an error occurs in the transmission or if there is an attempt to falsify the digital data stream in any way, this is recognized during the deciphering by means of the characteristic of the strong error propagation and the specific type of combination of the individual elements of the digital data stream.

Due to the fact that with these arrangements and with these methods a constant integrity check value CICV can be used and no separate determination of a hash value or of a MAC value must be carried out, the required computing capacity for the encryption is considerably reduced.

However, it is unproblematically possible also additionally to form a hash value or, respectively, an MAC value, in order to process this value with the inventive method in connection with the digital data stream.

In particular, the following attacks are recognized by this method or, respectively, by these arrangements:

each modification of a bit in the digital data stream leads to a modification of the constant integrity check value CICV and is recognized for this reason;

at least the pair-by-pair exchange of the cryptographically processed data blocks $C_n$ during the transmission of the digital data stream is also recognized in the receive unit E during the execution of the method or, respectively, in the use of the arrangement.

In addition, these arrangements or, respectively, these methods are secure against what are known as the "known plaintext attacks," provided that, on the basis of the knowledge of the data blocks $P_n$ and of the cryptographically processed data blocks $C_n$, it is nonetheless impossible for an attacker to determine the key K and the values IV1 and IV2 with an exhaustive key search.

This is due to the fact that the attacker can never determine the intermediate quantities $I_n$ because the intermediate quantities $I_n$ are internal variables, as is the first value IV1 or, respectively, the second value IV2.

The internal variables are required by an attacker in order to carry out an exhaustive search in order to endanger the encryption methods.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A system for cryptographic processing of a digital data stream having an arbitrary number of data blocks, for recognition of a modification of a sequence of the cryptographically processed data blocks, comprising a processing unit for at least a part of the data blocks, the processing unit comprising:

a first logic unit to which a respective data block is supplied via a first input, to which at least one preceding data block is supplied via a second input, and to which at least one preceding intermediate quantity is supplied via a third input, the first logic unit constructed such that a combination quantity is determined by combining the respective data block, the preceding data block and the preceding intermediate quantity;

an encryption unit, with which an intermediate quantity is determined by applying a block encryption method to the combination quantity; and a second logic unit, to which the intermediate quantity is supplied via a first input and to which at least one preceding cryptographically processed data block is supplied via a second input, the second logic unit constructed such that a respective cryptographically processed data block is determined by combining the intermediate quantity and the preceding cryptographically processed data block.

2. The system according to claim 1, wherein at least one of the logic units is or, respectively, are constructed such that the quantities supplied to the at least one of the logic units are EXCLUSIVE-OR combined with one another.

3. The system according to claim 1, wherein at least one of the logic units is or, respectively, are constructed such that the at least one of the logic units is supplied via a first input with a first data block or, respectively, a first intermediate quantity, or, respectively, a first cryptographically processed data block or, respectively, a first combination quantity, and, via a second input, is supplied with a predeterminable first value.

4. The system according to claim 3, wherein the first logic unit of the processing unit of a first data block is constructed such that a predeterminable second value is supplied via a third input.

5. The system according to claim 4, wherein the second value is assigned the value 0.

6. The system according to claim 1, wherein the processing unit further encrypts the data stream and/or secures integrity of the data stream.

7. A system for cryptographic processing of a cryptographically processed digital data stream having an arbitrary number of cryptographically processed data blocks, for recognition of a modification of a modification of a sequence of the cryptographically processed data blocks, comprising a processing unit for at least a part of the cryptographically processed data blocks, the processing unit comprising:

a first logic unit, to which a respective cryptographically processed data block is supplied via a first input and to which at least one preceding cryptographically processed data block is supplied via a second input, the first logic unit constructed such that an intermediate quantity is determined by combination of the respective cryptographically processed data block and the preceding cryptographically process data block;

a decryption unit, with which a combination quantity is determined by application of a block encryption method to the intermediate quantity; and a second logic unit, to which the combination quantity is supplied via a first input, to which at least one preceding intermediate quantity is supplied via a second input and to which at least one preceding data block is supplied via a third input, the second logic unit constructed such that a respective data block is determined by combination of the combination quantity, the preceding intermediate quantity and the preceding data block.

8. The system according to claim 7, wherein the processing unit further encrypts the data stream and/or secures integrity of the data stream.

9. The system according to claim 7 wherein at least one of the logic units is or, respectively, are constructed such that the quantities supplied to the at least one of the logic units are EXCLUSIVE-OR combined with one another.

10. The system according to claim 7, wherein at least one of the logic units is or, respectively, are constructed such that the at least one of the logic units is supplied via a first input with a first data block or, respectively, a first intermediate quantity, or, respectively, a first cryptographically processed data block or, respectively, a first combination quantity, and, via a second input, is supplied with a predeterminable first value.

11. The system according to claim 10, wherein the first logic unit and/or the second logic unit of the processing unit of a first data block is constructed such that a predeterminable second value is supplied via a third input.

12. The system according to claim 11, wherein the second value is assigned the value 0.

13. A method for cryptographic processing of a digital data stream having an arbitrary number of data blocks, comprising:

determining an intermediate quantity from a respective data block with a block encryption method, taking into account at least one preceding data block and at least one preceding intermediate quantity of the preceding data block;

forming a respective cryptographically processed data block by combination of the intermediate quantity with at least one preceding cryptographically processed data block of the preceding data block.

14. The method according to claim 13, wherein a combination quantity is determined from the respective data block, from the at least one preceding data block and from the at least one preceding intermediate quantity of the preceding data block, by combination of the respective data block, the preceding data block and the preceding intermediate quantity, and wherein the block encryption method is applied to the combination quantity.

15. The method according to claim 13, wherein at least one of the combinations takes place as an EXCLUSIVE-OR combination.

16. The method according to claim 13, wherein a first data block or, respectively, a first intermediate quantity or, respectively, a first cryptographically processed data block or, respectively, a first combination quantity is processed by combining the first data block or, respectively, the first intermediate quantity or, respectively, the first cryptographically processed data block with a predeterminable first value or, respectively, the first combination quantity.

17. The method according to claim 16, wherein a predetermined second value is taken into account in the combination of the first data block or, respectively, the first intermediate quantity or, respectively, the first cryptographically processed data block.

18. The method according to claim 17, wherein the value 0 is assigned to the second value.

19. The method according to claim 13, further comprising at least one of encrypting the data-stream; and securing integrity of the data stream.

20. A method for cryptographic processing of a cryptographically processed digital data stream having an arbitrary number of cryptographically processed data blocks, for recognition of a modification of a sequence of the cryptographically processed data blocks, comprising at least a part of the cryptographically processed data blocks:

determining an intermediate quantity from a respective cryptographically processed data block by combination with a preceding cryptographically processed data block;

determining a combination quantity from the intermediate quantity using a block encryption method; and determining a data block by combination of the combination quantity with at least one preceding intermediate quantity and at least one preceding data block.

21. The method according to claim 20, further comprising at least one of encrypting the data stream; and securing integrity of the data stream.

22. The method according to claim 20, wherein a combination quantity is determined from the respective data block, from the at least one preceding data block and from the at least one preceding intermediate quantity of the preceding data block, by combination of the respective data block, the preceding data block and the preceding intermediate quantity, and wherein the block encryption method is applied to the combination quantity.

23. The method according to claim 20, wherein at least one of the combinations takes place as an EXCLUSIVE-OR combination.

24. The method according to claim 20, wherein a first data block or, respectively, a first intermediate quantity or, respectively, a first cryptographically processed data block or, respectively, a first combination quantity is processed by combining the first data block or, respectively, the first intermediate quantity or, respectively, the first cryptographically processed data block with a predeterminable first value or, respectively, the first combination quantity.

25. The method according to claim 24, wherein a predeterminable second value is taken into account in the combination of the first data block or, respectively, the first intermediate quantity or, respectively, the first cryptographically processed data block.

26. The method according to claim 25, wherein the value 0 is assigned to the second value.

* * * * *